(12) United States Patent
Janik

(10) Patent No.: US 7,107,605 B2
(45) Date of Patent: Sep. 12, 2006

(54) DIGITAL IMAGE FRAME AND METHOD FOR USING THE SAME

(75) Inventor: Craig M. Janik, Los Altos Hills, CA (US)

(73) Assignee: Simple Devices

( * ) Notice: Subject to any disclaimer, the term of this patent is extended or adjusted under 35 U.S.C. 154(b) by 1101 days.

(21) Appl. No.: 09/955,642

(22) Filed: Sep. 18, 2001

(65) Prior Publication Data

US 2002/0071139 A1    Jun. 13, 2002

Related U.S. Application Data

(60) Provisional application No. 60/233,834, filed on Sep. 19, 2000.

(51) Int. Cl.
*G06F 3/00* (2006.01)
*H04N 7/18* (2006.01)

(52) U.S. Cl. .................. 725/51; 725/80; 725/81; 725/85; 725/109; 725/113; 375/240.25

(58) Field of Classification Search ............. 725/109, 725/113, 51, 80, 81, 85, 110–112; 358/1.15; 375/240.01, 240.25; 709/203, 217, 218, 709/228
See application file for complete search history.

(56) References Cited

U.S. PATENT DOCUMENTS

| | | | |
|---|---|---|---|
| 5,959,536 A | 9/1999 | Chambers et al. | |
| 6,037,981 A | 3/2000 | Wilson et al. | |
| 6,049,281 A * | 4/2000 | Osterweil | 340/573.4 |
| 6,101,265 A | 8/2000 | Bacus et al. | |
| 6,442,573 B1 | 8/2002 | Schiller et al. | |
| 6,483,568 B1 * | 11/2002 | Folio | 352/20 |
| 6,591,247 B1 * | 7/2003 | Stern | 705/14 |

FOREIGN PATENT DOCUMENTS

| | | |
|---|---|---|
| DE | 3534652 A1 | 4/1987 |
| DE | 29608032 U1 | 7/1996 |
| WO | PCT/US 01/29347 | 2/2002 |

* cited by examiner

*Primary Examiner*—Kieu-Oanh Bui
(74) *Attorney, Agent, or Firm*—Gary R. Jarosik

(57) ABSTRACT

A digital image frame and method for using the same are provided. In one embodiment, the digital image frame is coupled with a computer system via a local area network (LAN). Data is sent between the digital image frame and computer system.

8 Claims, 15 Drawing Sheets

DIGITAL IMAGE FRAME AND METHOD FOR USING THE SAME

RELATED APPLICATIONS

This application claims the benefit of the filing date of U.S. Provisional Patent No. 60/233,834, filed on Sep. 19, 2000.

FIELD OF THE INVENTION

The present invention relates generally to digital images, and more particularly to a digital image frame.

BACKGROUND

The rapid buildup of telecommunications infrastructure combined with substantial investment in Internet-based businesses and technology has brought Internet connectivity to a large segment of the population. Recent market statistics show that a majority of households in the U.S. own at least one personal computer (PC), and a significant number of these PCs are connected to the Internet. Many households include two or more PCs. Decreases in the cost of PC components such as microprocessors, hard disk drives, memory, and displays, have driven the commoditization of PCs. Although the majority of household PCs are connected to the Internet by dialup modem connections, broadband connectivity is being rapidly adopted, and is decreasing in price as a variety of technologies are introduced and compete in the marketplace. A large majority of households in the U.S. and Europe are viable for at least one or more type of broadband connection, such as cable, DSL, optical networks, fixed wireless, or two-way satellite transmission.

A market for home networking technology has emerged, driven by the need to share an Internet connection between two or more PCs, and to connect all the PCs to productivity peripherals. There has been innovation in local area network (LAN) technology based on end-user desire for simplicity and ease of installation. Installing Ethernet cable is impractical for a majority of end-users, therefore a number of no-new-wires technologies have been introduced. The Home Phoneline Networking Association (HPNA) promotes networking products that turn existing phone wiring in the home into an Ethernet physical layer. Networking technology that uses the AC power wiring in the home to carry data signals has also appeared. Similar to HPNA devices, adapters are required to convert data signals from devices into voltage fluctuations carried on to and off of the AC wires, allowing any AC outlet to become a network interface.

Wireless radio-frequency (RF) LAN technology has also been introduced into the home networking market. Theoretically, wireless technology is the most convenient for the end user to install. There are currently two prevalent standards for wireless networking, Institute of Electrical and Electronics Engineers (IEEE) 802.11b and HomeRF. Both of these systems utilize the unlicensed 2.4 Ghz ISM band as the carrier frequency for the transmission of data. Both of these technologies have effective ranges of approximately 150 feet in a typical household setting. Adapters that are RF transceivers are required for each device to communicate on the network. In addition to utilizing Transmission Control Protocol/Internet Protocol (TCP/IP) protocols, IEEE 802.11b and HomeRF include additional encryption and security protocol layers so that the user's devices have controlled access to data being sent through the LAN.

Due to market competition and the effect of Moore's Law, home networking technology is greatly increasing in performance and availability, while decreasing in price. For example, the IEEE 802.11 technology roadmap shows the introduction of 802.11a at 54 Mbps, also utilizing the 5 Ghz band. It is important to note that LAN data-rates are increasing much faster than wide-area (broadband) data-rates, such as the data-rates provided by "last mile" technologies including DSL, DOCSIS.

While networked PCs with Internet connectivity provide greater convenience for productivity applications, there are other trends that are influencing end user's content experiencing habits. Most notably, the digitization of content across all media types is creating portability and reusability that are affording new uses and content presentation scenarios. For example, Personal Video Recorders (hereafter PVRs are increasing in popularity. These devices are an improvement on VCR "time-shifting" functionality, allowing users to record, pause, and start live broadcast media, almost in real time. These devices digitize terrestrially broadcast television content and store the files on a hard disk drive, providing much faster random access, fast-forwarding, and rewinding. A graphical user interface is provided that allows users to make content preference selections.

The MP3 digital audio format is an audio encoding technology that allows consumers to further compress digital audio files such as those found on Compact Disks, to much smaller sizes with very little decrease in sound quality. For example, the MP3 format allows for compression of audio content to approximately 1 million bytes per minute of audio, at near Compact Disk quality. The smaller size of MP3 encoded audio files has also enabled these files to be shared by users across the Internet, since the transfer of these files takes an acceptable amount of time. In addition to music, many other types of audio content are now available in digital format, such as spoken-word content, news, commentary, and educational content. Digital files containing audio recordings of books being read aloud are available for download directly from their website.

Graphic content such as digital still images and digital multimedia video files are also increasingly available. Digital still and video cameras allow the capture and rapid transfer of images. Digital cameras are gaining popularity in the market because of the increases in media density and convenience provided at the camera, and because of the portability of the digital image files themselves. Products exist that allows users to share digital images across the Internet. One example is the Ceiva Picture Frame provided by Ceiva Logic, Inc.,. The Ceiva product includes a frame housing similar to a conventional picture frame, but with a large LCD 176 in place of a photograph. The device includes a microprocessor 192, memory, and modem. The device must be plugged into a phone line, and it functions by automatically dialing-up to a Internet server where new digital images are stored. Based on user instructions made through a setup function on a website, a group of photos are sent to, stored on, and displayed by the device. In addition to the fact that they include a large LCD 176, digital picture frame 160s are expensive because they must also include enough memory to store a large quantity of digital content files.

Cable, as well as satellite TV services are efficient in providing video content to a wide variety of users. However, most existing cable and satellite systems provide video delivery services on a broadcast model, that is, customers must choose from a set number of audio/video programs that are simultaneously broadcast, with the schedule determined by the broadcast networks. With the overlaying of data services over existing cable lines, there is the opportunity to provide a video-on-demand service whereby customers could order video programming of their choice at any time. However, simple calculation shows that pure video-on-demand cannot be supported by the bandwidth available on the existing networks, due to the high data-rates required to transport high-quality video and audio in real-time.

The convergence of the digitization of graphical content, combined with the proliferation and decreasing cost of networking and data processing components, is providing the opportunity to deliver rich content via the Internet, to a variety of inexpensive devices beyond the personal computer.

What is needed is a system that provides an economically optimal architecture and management system for allowing users to set up preferences for digital images and video, and other services, to be automatically delivered to inexpensive image output devices. Further, the digital image output device should have the capability of being untethered by both AC power requirements and the network physical layer.

SUMMARY OF THE INVENTION

A digital image frame and method for using the same are provided. In one embodiment, the digital image frame is coupled with a computer system via a local area network (LAN). Data is sent between the digital image frame and computer system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DESCRIPTION OF PREFERRED EMBODIMENT

Figure 1:
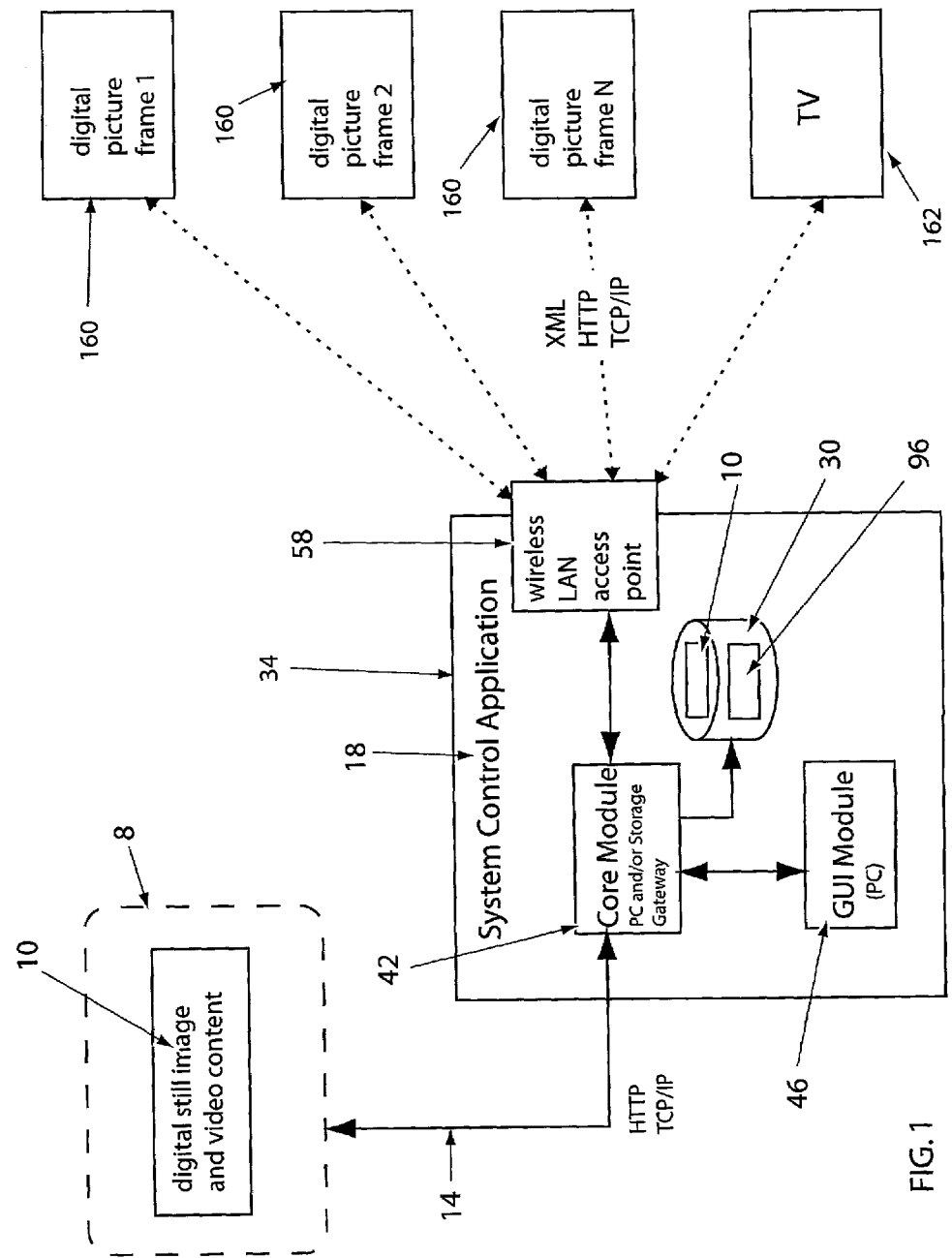
FIG. 1. illustrates a block diagram of one embodiment of a system at the highest level.

A digital image frame and method for using the same are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

A set of definitions is provided below to clarify the present invention.

DEFINITIONS

The Internet is used interchangeably with the term web or worldwide web. Both of these are defined as the worldwide network of PCs, servers, and other devices.

Broadband connection is defined as a communications network in which the frequency bandwidth can be divided and shared by multiple simultaneous signals. A broadband connection to the Internet typically provides minimum upstream and downstream data-rates of approximately 200K or more bits per second. There are many different types of broadband connections including DSL, cable modems, and fixed and mobile wireless connections.

A Data Over Cable System Interface Specification (DOCSIS) modem is an industry standard type of cable modem that is used to provide broadband access to the Internet over a coaxial cable physical layer that is also used for the delivery of cable TV signals (CATV).

A Digital Subscriber Line (DSL) modem is also an industry standard type of modem that is used to provide broadband access to the Internet, but over conventional copper phone lines (local loops).

The term gateway, used interchangeably with broadband gateway, is defined as an integral modem and router, and may include hub functionality. The modem function is used to change voltage fluctuations on an input carrier line (a DSL line input or a cable TV input) into digital data.

Routers are devices that connect one distinct network to another by passing only certain IP addresses that are targeted for specific networks. Hubs allow one network signal input to be split and thus sent to many devices.

Gateway storage peripheral is defined as an add-on storage device with processing power, an operating system, and a software application that manages the downloading and storage of data. An example scenario for the use of a gateway storage peripheral is a system where a user has a DOCSIS modem and would like to add an always-on storage capability. The gateway storage peripheral is connected to the DOCSIS modem via a USB port or an Ethernet port in the DOCSIS modem. A gateway storage peripheral in combination with a DOCSIS modem or any type of broadband modem is considered a storage gateway system. A PC that is always left on and connected to an always-on gateway with a DSL or broadband cable connection is considered a storage gateway system.

The term "message" is defined as information that is sent digitally from one computing device to another for various purposes. The term "content" is used to mean the information contained in digital files or streams. For example, content may be entertainment or news, or audio files in MP3 format. "Data" is used to mean information such as digital schedule contents, responses from devices sent back through the system, or digital messages and email. "Content" and "data" are sometimes used interchangeably. "Client devices" are those devices that are not fully functional without a host device such as a personal computer.

Local Area Network (LAN) is defined as a network structure that includes two or more devices that can communicate with other devices utilizing a shared communication infrastructure, including wired network technologies, such as Ethernet, or wireless network technologies such as Institute of Electrical and Electronics Engineers (IEEE) 802.11b or HomeRF technology. Wireless LAN technology such as IEEE 802.11b and HomeRF are based on the unlicensed 2.4 Ghz ISM (Industrial, Scientific, and Medical) frequency band and are well known the telecommunications and LAN industries. These networking technologies utilize Transmission Control Protocol/Internet Protocols (TCP/IP) protocols. A LAN typically constitutes a group of interconnected devices that share a common geographic location and are typically grouped together as a subnet. A local network, for example, would be a home network where several computers and other smart devices would be digitally connected for the purpose of transferring content and data, controlling each other, sharing programming, or presenting data and content to a user.

Codec (Compression/Decompression algorithm) is a software application that is used to decode (uncompress) encoded (compressed) media files or streams. Most content is stored and sent in a compressed format so that the content files are smaller and thus take up less storage space and use less bandwidth when being transferred via the Internet. The content is then decoded at the playback device. For example, MP3 audio files are encoded and must be decoded by a microprocessor running the codec in order for the audio content to be presented to the user in an analog format.

HTTP is Hyper-text transfer protocol, the protocol used by Web browsers and Web servers to transfer files, such as text and graphic files.

Data-rate is defined as the data throughput of a telecommunications system or technology, and is measured in a quantity of bits per second, such as millions of bits per second (Mbps).

Overview

First, a description of the various components of the system is provided. Then, a description of three functional modes is provided. It should be noted that the functionality of the software and hardware pertinent to the invention disclosed in this document is described at several levels including at the interface level (what the end user sees and experiences) and at the action level (software and hardware interactions involving digital messages, content, and data).

FIG. 1 illustrates a block diagram of one embodiment of a system at the highest level. The system provides a communication connection and a digital still image and video content management system including software and hardware on three different computing platforms: (1) the Internet 8, (2) a local PC 34 or PC 34 and a storage gateway 38, and (3) digital picture frame 160.

In one embodiment, PC 34 is a conventional computer including a microprocessor, system memory, hard disk drive 30, display, keyboard, and mouse, and runs the Windows operating system, provide by Microsoft Corporation. PC 34 also includes a Universal Serial Bus 62 (hereafter USB) port for connecting peripheral devices. Wireless LAN access point 58 is connected to PC 34 via USB port 62. PC 34 is connected to Internet 8 via a wide area network broadband communication link 14 that provides data delivery rates ranging from 500 kbps to 3,000 kbps.

Figure 14:
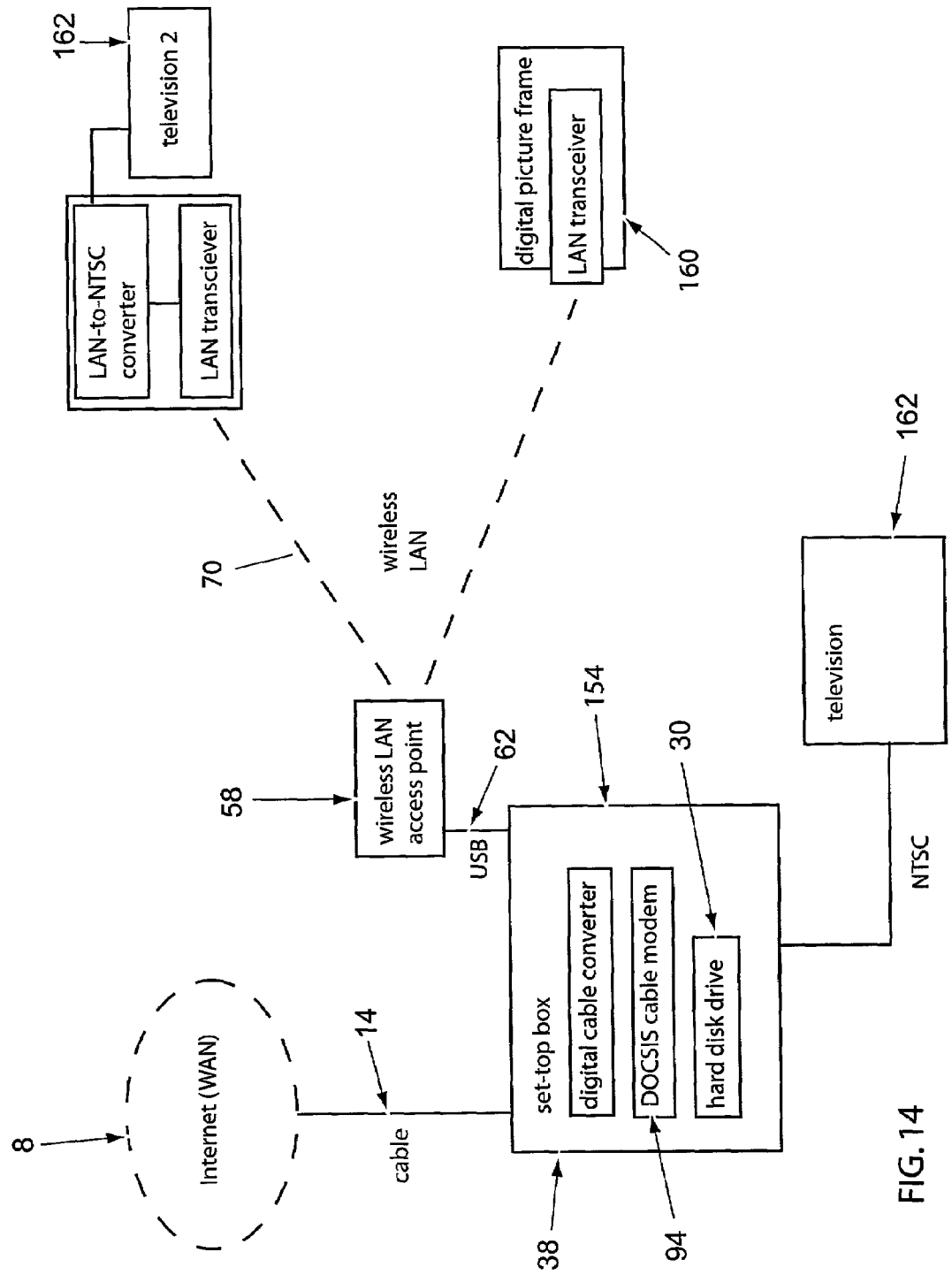
FIG. 14. illustrates one embodiment of a system for providing content, distribution, management, and interactivity for client devices.

In one embodiment, the broadband connection 14 is maintained by DOCSIS storage gateway 38. FIG. 14 illustrates a functional block diagram of one embodiment of a storage gateway 38 that is a digital cable set-top box. Hard disk drive 30 is combined with a conventional DOCSIS cable modem 94 and a wireless LAN access point 58. The core module 42 software application described below, runs on and functionally connects storage gateway 38 to the other system components.

Referring again to FIG. 1, in one embodiment, the high-speed LAN connection 70 between PC 34, storage gateway 38, and digital picture frame 160, is a HomeRF wireless network. The communications protocol between PC 34 and Internet 8 is HTTP and TCP/IP. The GUI module 46 software aspect of system control application 18 exists on PC 34. In one embodiment, core module 42 aspect of system control application 18 exists and is run on both storage gateway 38 and on PC 34. The communication message structure between digital picture frame 160 and PC 34 are XML formatted messages 74 sent over HTTP.

Description of Digital Picture Frame 160 Device

In an alternative embodiment, digital picture frame 160 may take many physical forms. In one embodiment, many digital picture frames 160 are nodes on a LAN 70, receiving digital still image and video content 10 and as well as text data, and instructions, from core module 42 subsystem of system control application 18. Digital picture frame 160 may send back XML message 74 control instructions and data based on user interaction. Digital picture frame 160 depends on LAN 70 connectivity to provide the majority of the functionality.

Figure 3:
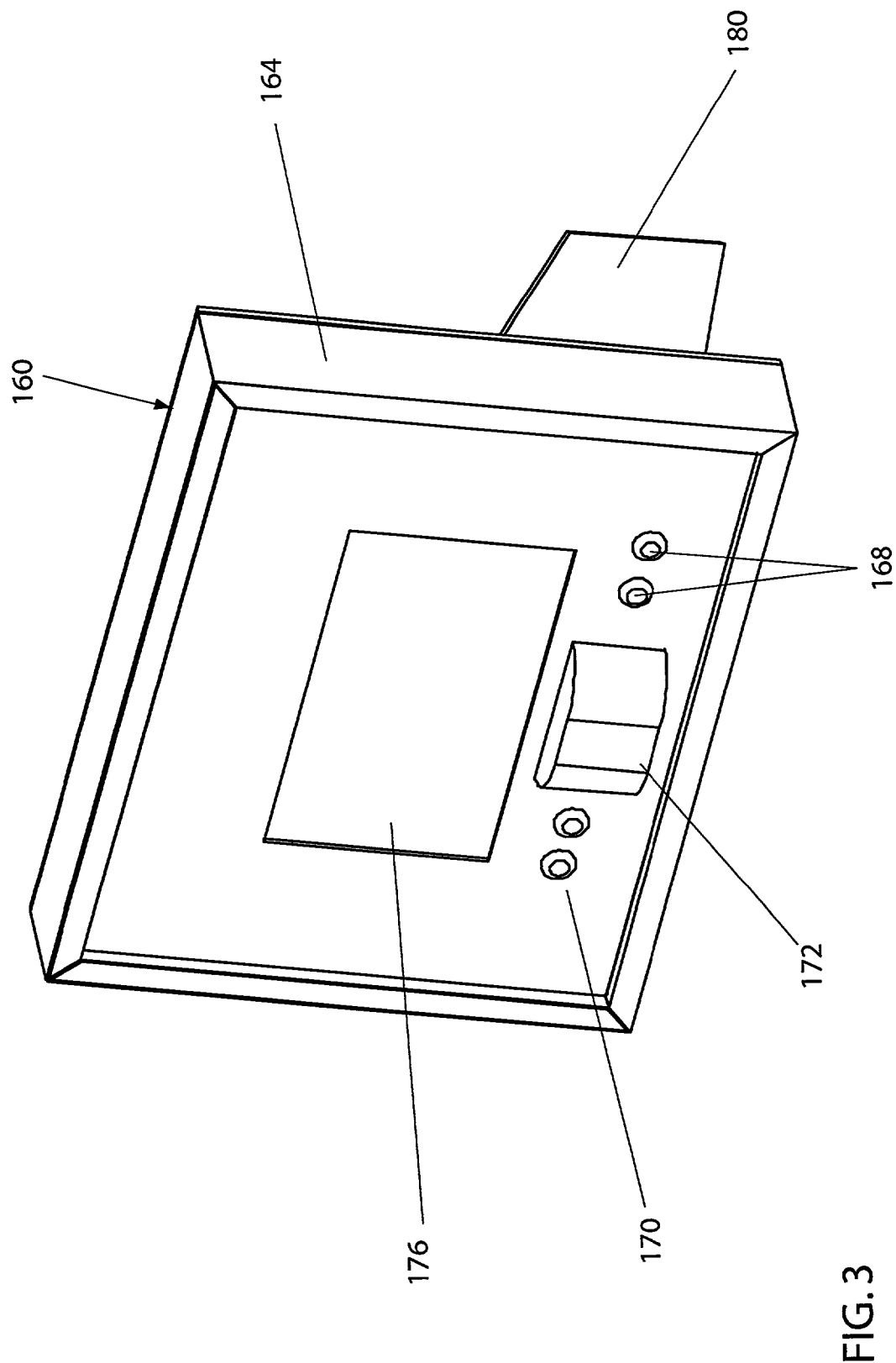
FIG. 3. illustrates an isometric view of one embodiment the digital picture frame.

FIG. 3 shows an isometric front view of digital picture frame 160. In different embodiments, digital picture frame 160 can be hung against a wall or, if the stand 180 attached to the back is flipped outwards, set upon a table. In one embodiment, digital picture frame 160 is entirely wireless and does not require network cable connection or a power cord. In this example, digital picture frame 160 operates on a battery that is removable and re-chargable. In another embodiment, digital picture frame 160 is powered by a wired AC transformer.

Figure 4:
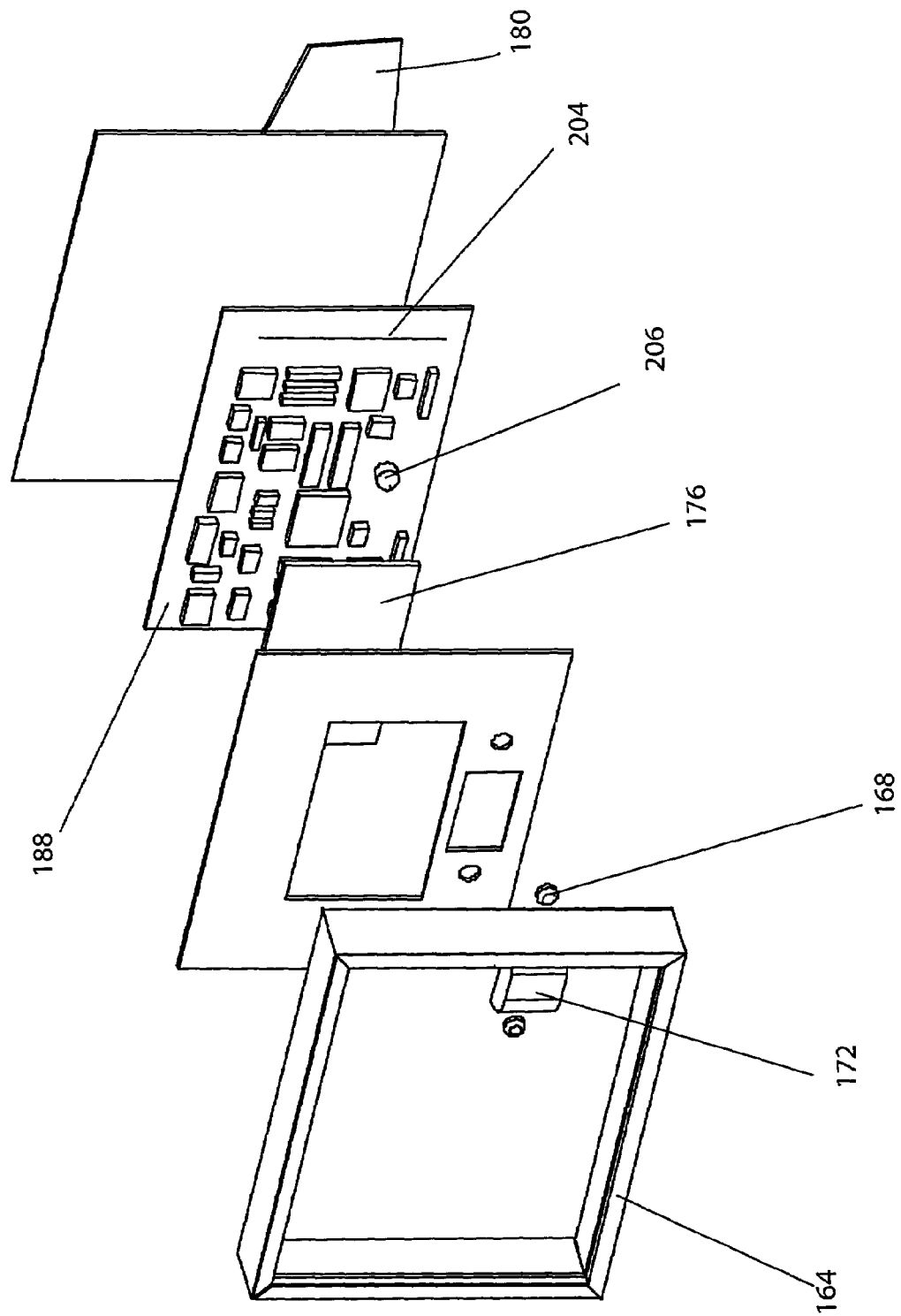
FIG. 4. illustrates an exploded view of one embodiment the digital picture frame.

Referring now to FIG. 4, digital picture frame 160 comprises an LCD 176 surrounded by an enclosure 164 with control buttons 168 and a Fresnel lens 172. In one embodiment, control buttons 168 are used to perform rudimentary system control functions such as scroll to the next picture, hold on a current image, or retrieve new pictures from PC 34. Fresnel lens 172 is part of the motion sensing sub-system of digital picture frame 160, which will be described below. Referring now to FIG. 4, slots in enclosure 164 support LCD 176, control buttons 168, Fresnel lens 172, and printed circuit board 188 attached behind it. LCD 176 contains an integral backlight so that the display may be viewed in low light.

Figure 5:
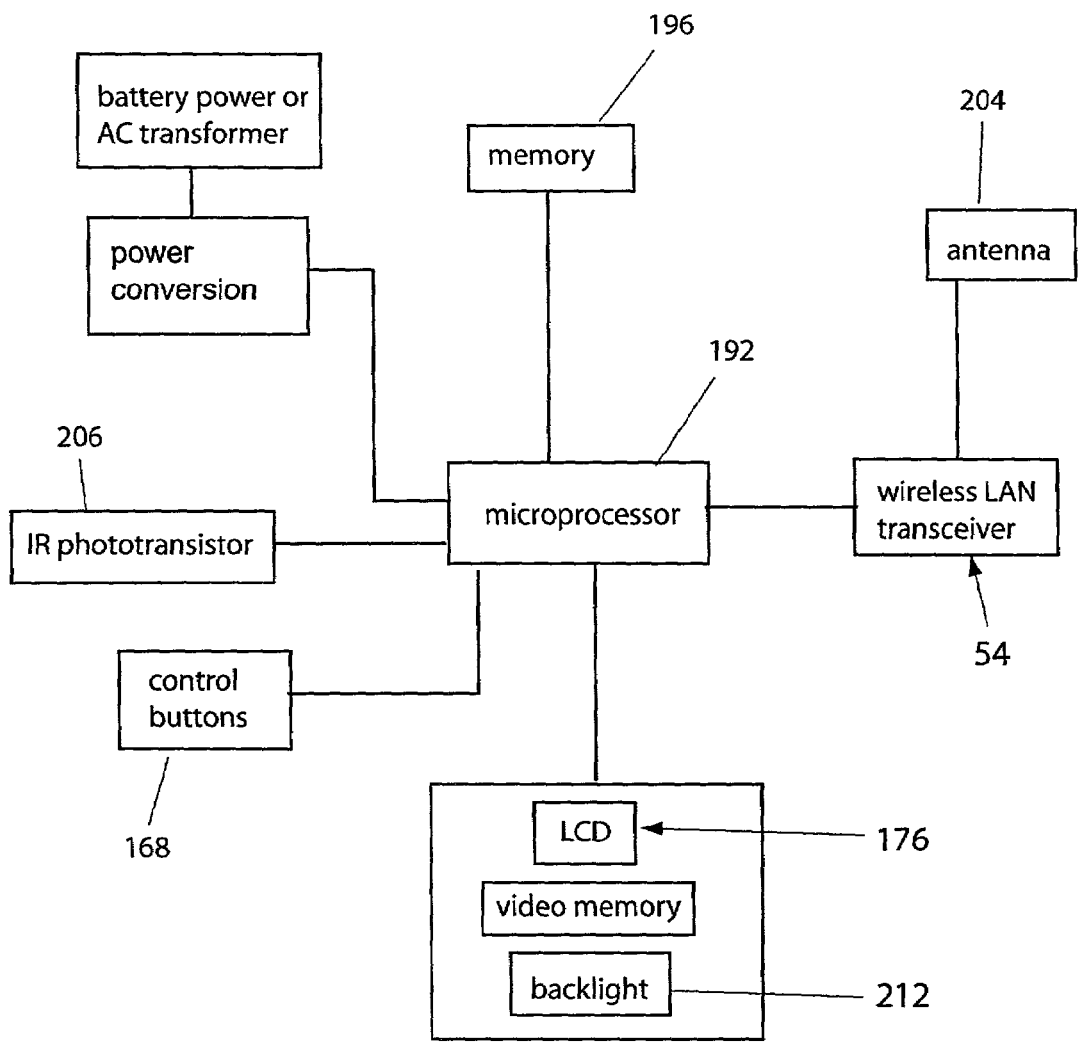
FIG. 5. illustrates a block diagram of one embodiment of the components in digital picture frame.

Referring now to FIG. 5, digital picture frame 160 includes a computer sub-system comprised of a microprocessor 192 and memory 196 running control firmware. Digital picture frame 160 also includes a power conversion sub-system, a wireless LAN transceiver 208 with an antenna 204, and a plurality of control buttons 168. Printed circuit board 188 connects the electronic components that constitute the functional data-manipulating aspect of the device.

Figure 13:
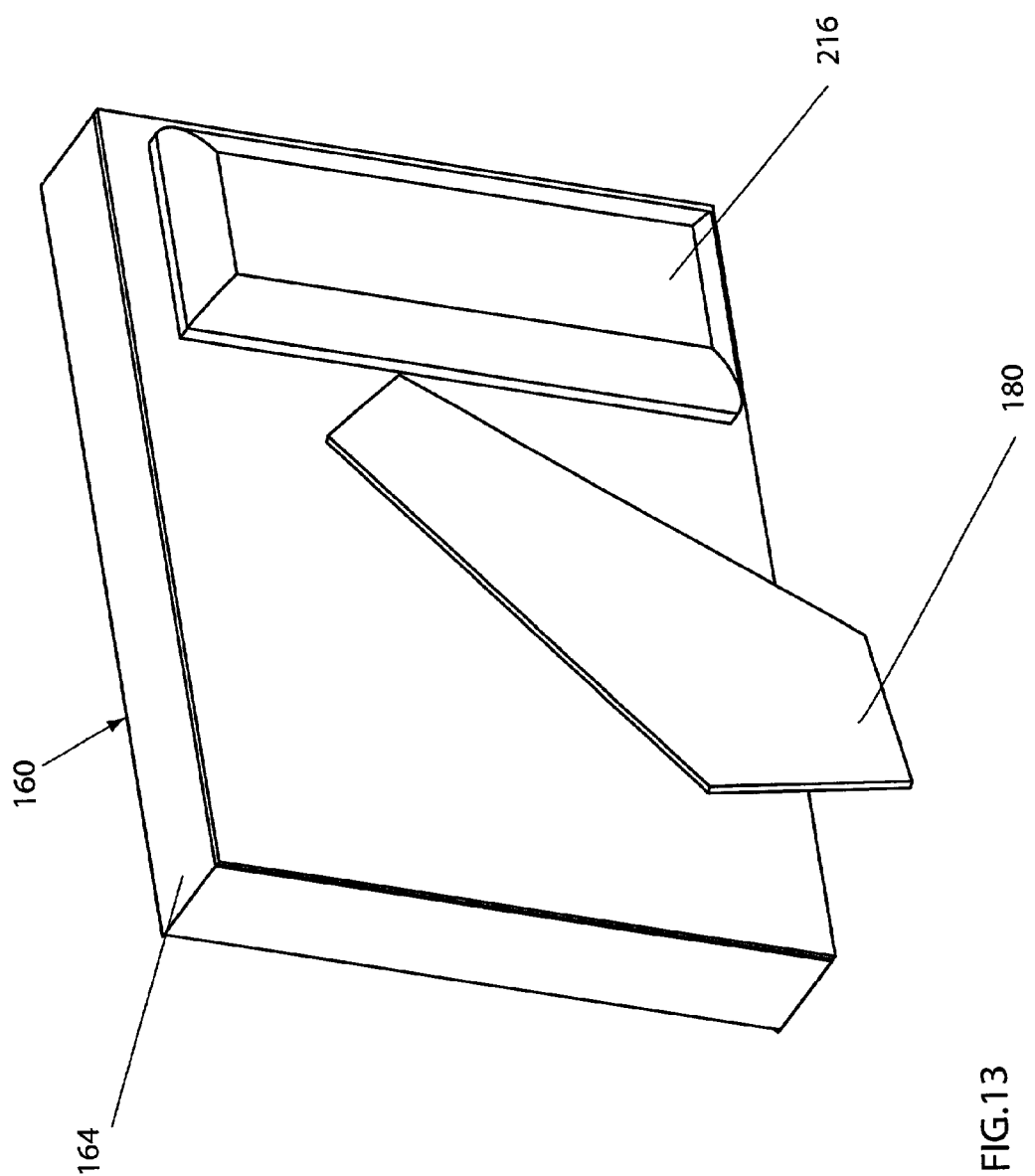
FIG. 13. illustrates a rear view of one embodiment of a digital picture frame 160.

In the embodiment where digital picture frame 160 operates solely on battery power, as shown in FIG. 13, it is beneficial to conserve power, therefore digital picture frame 160 includes a power management sub-system and a motion-sensing sub-system that combine to provide the capability to turn LCD 176 backlight 212 off and put computer sub-system into sleep mode, when it does not sense the presence of a person in the room.

In one embodiment, motion sensing sub-system consists of an IR phototransistor 206, Fresnel lens 172, and related circuitry. IR phototransistor 206 is used to detect changes in IR radiation caused by the presence of body heat generated by a human. The Fresnel lens 172 is used to focus IR radiation from the surrounding area onto the IR phototransistor 206. One function of control firmware continually monitors the output of the motion sensing sub-system, which is typically a changing voltage or a high voltage if there is motion or human presence. Control firmware will act to keep digital picture frame 160 powered and presenting images when there is a human presence.

Digital still image content delivery to the digital picture frame 160 is performed as follows. At a predetermined time during the day, or upon the user's request, a digital image file 10 from the PC 34 is sent, via LAN 70, to digital picture frame 160. Wireless LAN transceiver 54 and its related circuitry converts the RF signals into bits that are stored in buffer memory 196.

In one embodiment, PC 34 has a continuous LAN 70 communication link with the digital picture frame 160. Memory 196 buffer on digital picture frame 160 is continuously filled with digital content, which is processed locally by computer sub-system and then displayed on the LCD 176.

For example, PC 34 can send a first high resolution digital image that would be received, decoded, and stored in the local memory of digital picture frame 160, and presented on LCD 176. First digital image takes up less than half of memory 196 in digital picture frame 160. A second digital image is then transmitted to digital picture frame 160, using up less than half of memory 196. Then, after a few moments (an interval that can be controlled by a user), first digital image is erased from memory 196 and a second digital image is drawn on LCD 176. While second digital image is presented on LCD 176, a third digital image is downloaded into digital picture frame 160. A digital image is always being transmitted from PC 34 to digital picture frame 160 while a previous digital image is being displayed. This process continues with as many digital images being successively sent as are set up by user.

In one embodiment, digital video, such as an MPEG-2 file, can be streamed to digital picture frame 160. A quantity of MPEG file is sent via the wireless network, to digital picture frame 160, where it is stored in buffer 196 memory, decoded, and output to LCD 176. As digital picture frame 160 processes (decodes) and presents the portion of the MPEG file that is in its buffer memory 196, a portion of memory 196 becomes free. When enough memory 196 is available, digital picture frame 160 sends a message to PC 34 that there is memory 196 space and PC 34 sends a next quantity of the MPEG file, which is received, decoded and presented on LCD 176. With this system, a significantly long, full-motion video file can be presented on digital picture frame 160, without having to include the total amount of storage memory 196 to store the whole MPEG file at digital picture frame.

Figure 6:
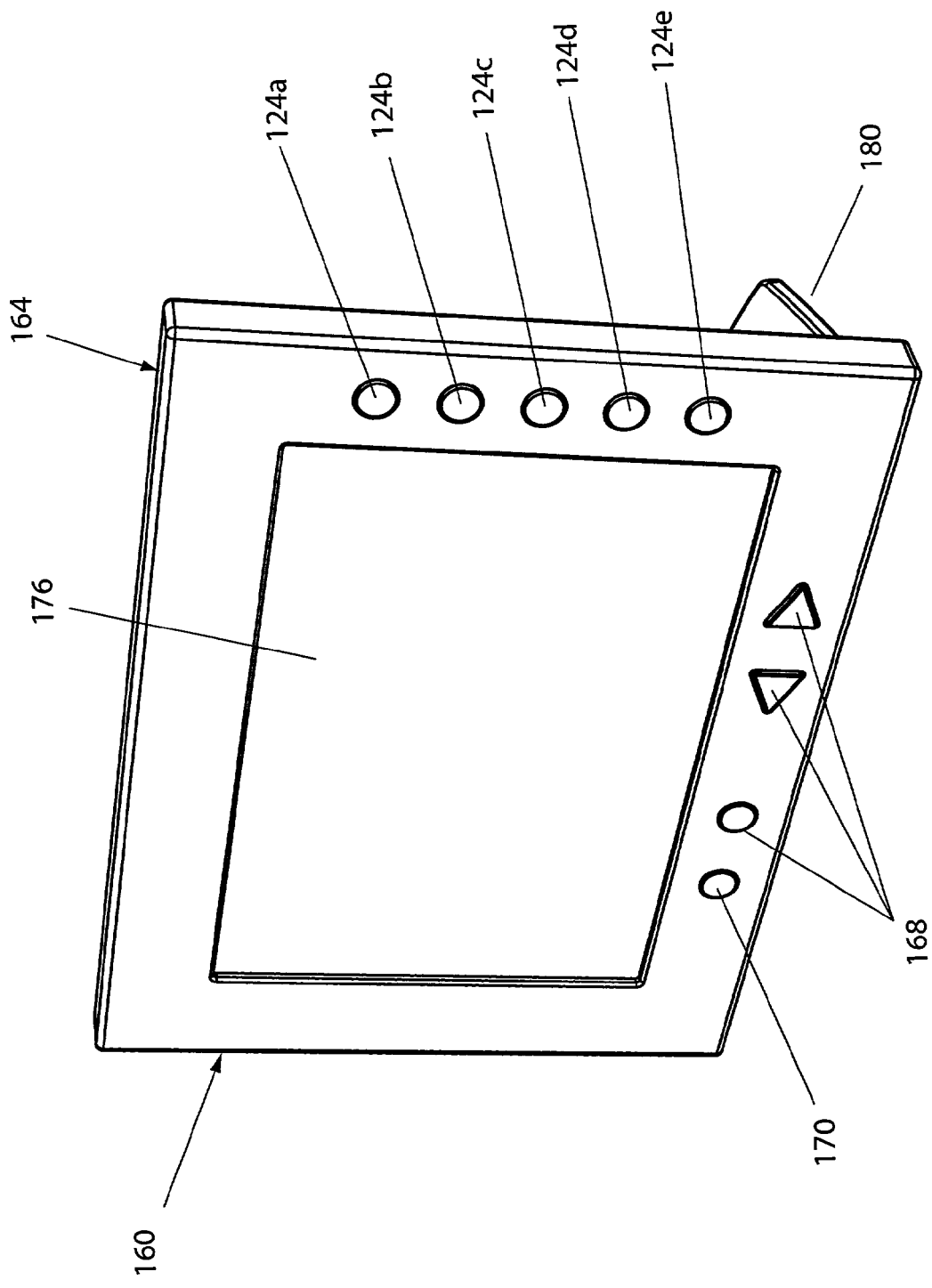
FIG. 6. illustrates an isometric view of one embodiment of a digital picture frame including programmable soft-keys.
Figure 12:
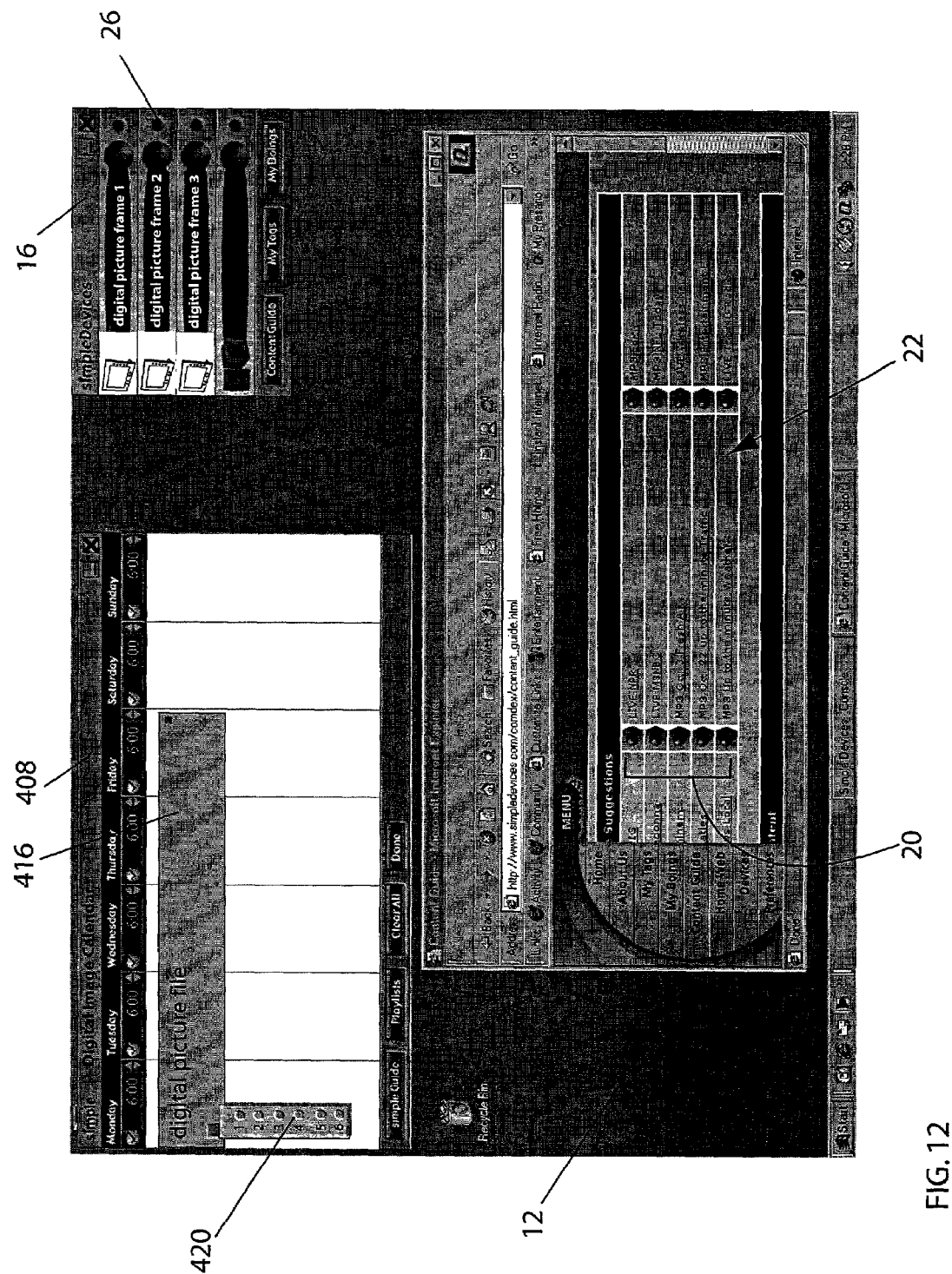
FIG. 12. illustrates one embodiment of a web-based content guide GUI window and a digital image calendar GUI and a softkey assignment pop-up menu.

One embodiment, shown in FIG. 6 is digital picture frame 160 that includes programmable soft-keys 124 a–e along the right edge of enclosure 164. Programmable soft-keys 124 a–e are buttons to which specific items of content are associated. When one of programmable soft-keys 124 a–e are activated, a specific digital content item is presented on LCD 176. Softkey buttons 124 a, b, c, d, and e, along-side LCD 176 are labeled by graphics on LCD 176. Softkey buttons 124 a–e can be used as presets to allow the user to jump to content presentations that are associated with each button by a GUI pull-down menu 420 on digital image calendar editor 408, as shown in FIG. 12.

In one embodiment, a tag button 128 is included for triggering the transmission of information about a currently playing track (file, Internet 8 stream, or terrestrial broadcast) back through the system for presentation to the end user on tag aggregation web page 56, or for delivery to the content creator or content originator.

There are two classes of digital still image and video content that may be directed the digital picture frame 160:

1) Digital still image or video content that originates from a third party, such as a news organization or any other affinity content provider, such as a member of a user's personal access group. Members of the personal access group could be members of the user's family or friends.

2) Digital still image or video content that originates locally from the user.

Web Content Guide

Referring again to FIG. 1, digital still image and video content 10 on Internet 8 may be expressed on web pages as an organization of text and graphical information, some of which is configured as interactive hyperlinks, all of which are formatted using HTML for presentation to end user's PCs 34 via HTTP communication protocols. A content selection web page 22 is shown in FIGS. 9 through FIG. 12. The graphical interactive representation of the portal to the end user is as a series of hyper-linked web pages and hyper-linked text and images. The physical manifestation of the portal is that of software and data stored on servers located at various and disparate physical locations, but connected by Internet 8.

Digital still image and video content 10 on Internet 8 may be arranged for delivery to digital picture frame 160 by a system that allows for graphical icons, referred to in this disclosure as content objects 20, that exist on content selection web page 22, to be dragged and dropped onto content editors on PC 34. Drag and droppable content object 20 is a graphical representation of a file system path that points to a digital content file stored locally on hard disk drive 30 on PC 34 or on storage gateway 38, or on a server on Internet 8, or is the graphical designation of a URL or IP address and port number of an digital content stream originating on a server on Internet 8. The purpose of the portal is to simplify and facilitate the discovery and selection of content 10 from Internet 8 for later use on digital picture frame 160.

Content selection web page 22 capability may include, but is not limited to the following functionality:

1) Presentation and organization of digital still image and video content and or links to content according to file type (e.g.: JPEG, GIF, TIFF, Postscript, DXF, PDF, PICT, and MPEG-2, MPEG-4 and the like), and or according to genre.
2) Further sub classification of content within file types or genres. For example a "news" category may be further divided into additional classifications such as "politics", "sports", "business", and the like;
3) Additional information that is relevant to digital still image or video content links. For example, an image link may be displayed with information about the content such as text, audio, etc.
4) A system to search for particular digital still image or video content on the web portal and or its affiliate links; and
5) A system to retain user preference information for the purpose of customizing the web portal content according to the users preferences.

Digital still image and video content 10 from Internet 8 that may be used in the system disclosed here may be selected from a wide range of content selection web pages 22, that may be formatted differently, and may be available from many different content creators and content aggregators. Content creators include for example the news gathering organizations whose business it is to create or commission to create, and own content. Content aggregators are firms whose business it is to collect content for the purpose of enabling ease of selection by end users and distribution.

The capability for determining and aggregating the content objects 20 presented to a specific user on content selection web pages 22 are derived from content preferences selections provided by the user. For example, referring now to FIG. 15 a content preference selection web page 24 is shown with content selection check boxes 42 beside content selection labels 46 that describe a variety of content choices.

Figure 15:
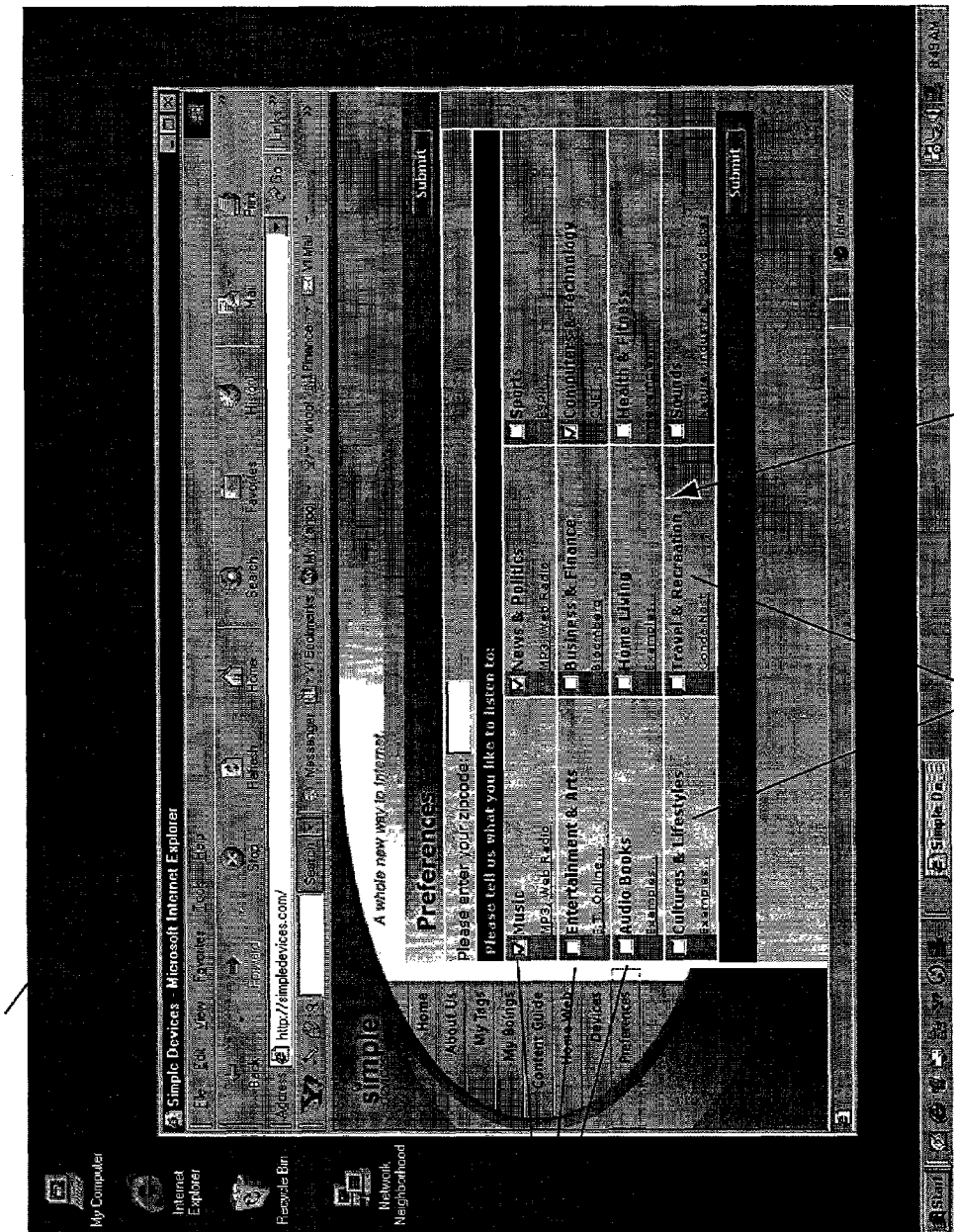
FIG. 15. illustrates one embodiment a content preference selection web page.

In one embodiment, the user may use the mouse to click on the boxes next to desired content types, as shown in FIG. 15. Thereafter upon returning to content selection web page 22, only content objects 20 that relate to the selected content types are displayed to the user. Functionally, content selection labels 46 are graphical representations of HTML links to actual content files, such as digital audio or digital video files. These links are organized and stored in a content link database on content link database server. The actual content files to which content selection labels 46 refer are stored at the content creator's or content aggregator's servers.

One embodiment of digital picture frame 160 system provides the capability of creating a personal content provider group on the content selection webpages. The personal content provider group function on content selection webpages allows external users who create digital still image or video files to place these files in an content queue where digital still image or video files can be uploaded through the system, cached on user's PC 34, and transmitted to the user's digital picture frame 160. The process uses file transfer protocol to move files from an external user's PC to an Internet 8 server and then to the user's PC 34. The user can designate the number of digital still image or video files that are permitted to be transmitted to digital picture frame 160. The user can also designate which external users can send digital still image or video content to the user's digital picture frame 160.

System Control Application

Figure 2:
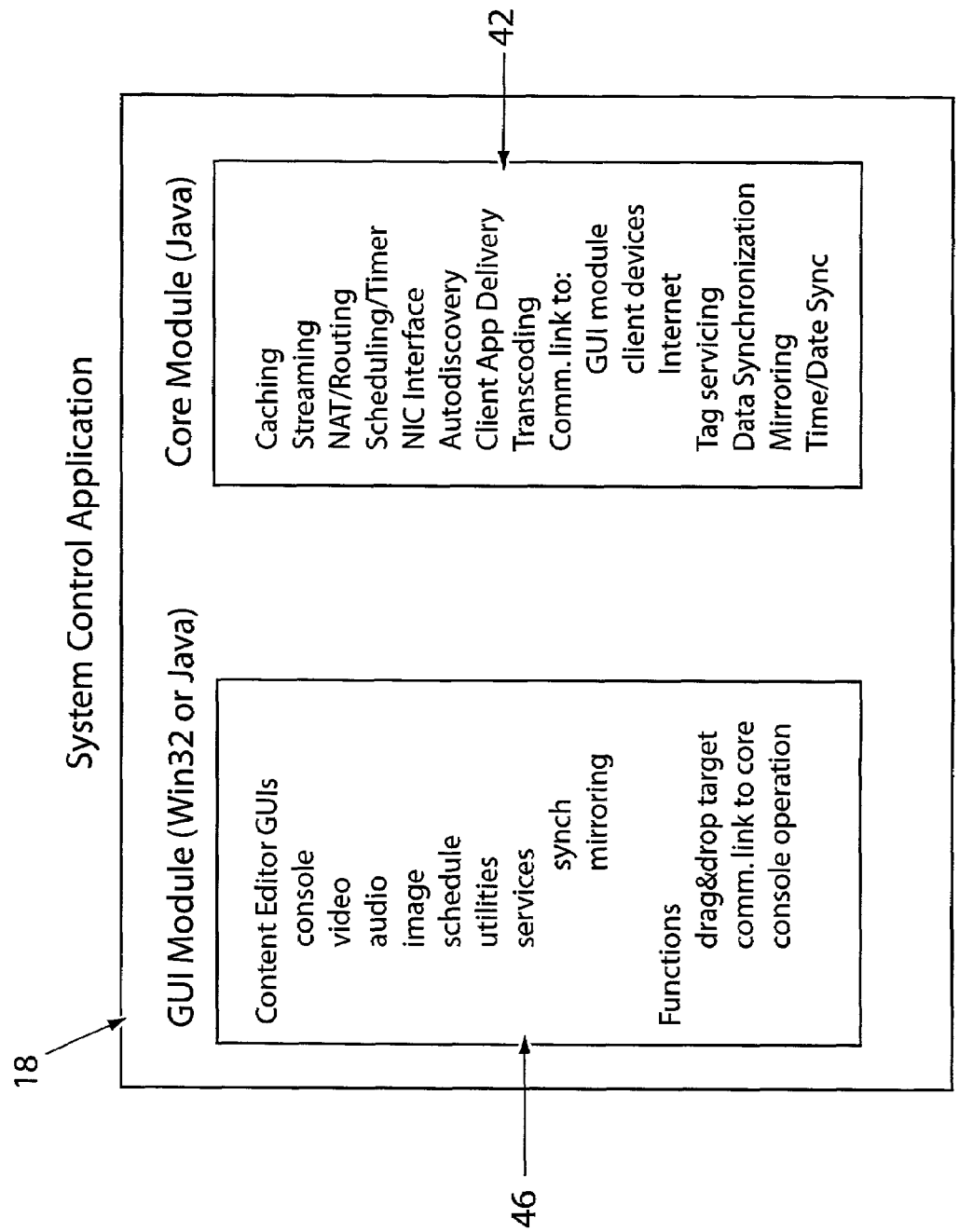
FIG. 2. illustrates a block diagram of one embodiment of a system control application.

Referring now to FIGS. 1 and 2, system control application 18 is comprised of two sub-applications, the core module 42 and the Graphical User Interface (hereafter GUI) module 46. In one embodiment, core module 42 is implemented as a multi-threaded Java application with instances running on both PC 34 and storage gateway 38.

In one embodiment, a Windows version of a Java Virtual Machine (JVM) resides and runs on PC 34 and interprets core module 42 instructions for the Windows operating system. Likewise, a VxWorks version of JVM interprets core module 42 instructions to VxWorks. GUI module 46 may be implemented as a Win32 application and resides and runs on PC 34. System control application 18 serves the function of managing the connection between content 10 and various servers on Internet 8, and PC 34 and storage gateway 38, and also manages the flow of information between PC 34 and storage gateway 38, and digital picture frame 160.

Core module 42 and GUI module 46 access and modify the system control application database 96 using methods called over HTTP and expressed with XML grammar. System control application database 96 is a set of files that contain system parameters and data. For example, a digital still image file shown in digital image sequence editor 408 is referenced as a file name and a path designation a particular hard disk drive 30 on either of PC 34 or storage gateway 38, in a listing in system control application database 96. Actions that are taken, such as playing this file, are triggered by XML messages 74 sent from digital picture frame 160 via LAN 70 or from GUI module 46 to core modules(s) 42 over HTTP.

The GUI module includes segments of the software application that run the GUI, including, but not limited to, the following functions:

1. Displaying GUI elements on a computer display for view by the end user;
2. Acknowledging user responses made via mouse and keyboard, or other pointing and interaction devices;
3. Allowing for manipulation of the GUI elements such as:
   a. drag and drop 28 of content objects 20,
   b. GUI button activations,
   c. text entry, and
   d. pull down menu and menu selections;
4. Communication between GUI module 46 and core module 42. The selections and control manipulations made by the end user are communicated to core module 42 where they can be acted upon; and launching of digital image sequence editor from a system console 16, as shown initially in FIG. 3, described below.

Core module 42 includes the portion of the system control application 18 that acts on content and data 10 from Internet 8 and also processes commands contained in messages sent from digital picture frame 160, providing, but not limited to, the following functions:

1. Communication links:
   a. Accessing content 10 on Internet 8 at a prescribed location as determined by user inputs into the GUI content editors such as digital image sequence editor;
   b. Accessing and communicating with GUI module 46, and
   c. Accessing and communicating with digital picture frame 160;

2. Managing the caching (local storage) of digital still image and video content 10 from Internet 8 or otherwise digital content files;
3. Transmission (serving) of digital content 10 from Internet 8 to digital picture frame 160 connected to PC 34 and storage gateway 38 via LAN 70:
   a. Uploading of digital still image files to the digital picture frame 160, and
   b. Streaming of digital video from PC 34 to digital picture frame 160;
4. Scheduling—time-based automation of the accessing, caching, and streaming of content 10 from Internet 8 at times prescribed by the user or at times derived by direction given by the user through the digital image sequence editor. The scheduling function accesses time and date inputs associated with actions stored in system control application database 96 by GUI module. The scheduling function periodically compares these time and date entries with the current state of PC's 34 or storage gateway's 38 internal timer. When there is a match, the action is taken;
5. Managing user responses at digital picture frame 160—messages are sent from digital picture frame 160 to core module 42, based on button activations at digital picture frame 160;
6. Network Address Translation (NAT) and routing—there is a mode of operation where digital picture frame 160 is connected to the Internet 8 in real time. Core module 42 acts to connect messages and streams from digital picture frame 160 to Internet 8, and from Internet 8 to the digital picture frame 160;
7. Digital picture frame 160 Application/Software Delivery—digital picture frame 160 application code can be stored at PC 34 or storage gateway 38 and delivered to digital picture frame 160 on an as-needed basis. For example, if digital picture frame 160 must be able to decode a variety of different encoded video streams, then a specific CODEC (sent as a BLOB—binary large object) can be delivered to digital picture frame 160 via LAN 70 and installed into memory immediately before a content stream requiring that specific CODEC. Many different types of applications can be delivered just-in-time to digital picture frame 160. The advantage of this feature is that is requires digital picture frame 160 to have smaller quantities of non-volatile (flash) memory and smaller quantities of volatile (SDRAM) memory. Reprogramming or modifying the firmware at digital picture frame 160 is also made easier since the software is accessible at PC 34 or storage gateway 38;
8. Transcoding—Certain types of digital still image or video content will be received at PC 34 or storage gateway 38, decoded, re-encoded using a different CODEC at PC 34, and then streamed to digital picture frame 160;
9. Auto-discovery—digital picture frame 160 connected to PC 34 via LAN 70 will automatically appear as a specific client device control bar 26 on console 16 located on PC 34 desktop 12. One or more client device control bars 26 constitute console 16, shown in FIG. 3 through FIG. 11;
10. Message Transactions—text or other content or data from the Internet 8 can be transferred and presented on digital picture frame 160;
11. Tag servicing—when a tag button 128 is pressed on digital picture frame 160, time, data, and information pertaining to currently playing content is aggregated into a message and sent to tag storage and processing server. Tag processing services included in core module 42 acquire information that is included in the message. Tagging is described in greater detail later in this document. Tag servicing includes a function where core module 42 periodically accesses a specific location on Internet 8 to acquire and store an accurate time and date;
12. Synchronization—Data, such as user data and related information, such as an accurate time and date, must be synchronized across the three platforms (web, device, and local server). Core module 42 time and date data is thus synchronized with an external (absolute) standard; and
13. Mirroring—Users can specify that content selections they make using the digital image sequence editor is to be mirrored at various other devices. For example, a user may have digital picture frame 160 and a PDA with the capability of storing digital still images. The user can specify that they want digital still images that are cached on storage gateway 38 in the home to be mirrored exactly in the PDA. The end user can thereby carry some of the same stored digital image content on the PDA that is available in the home. This function assumes the existence of a communication link between the PDA and PC 34, such as a wireless LAN communication link. Mirroring and synchronization can also occur during the docking functions that are typically used with most PDAs.

System control application 18 and system control application database 96 are designed to function with a number of instances of core module 42 and GUI module 46 running concurrently on multiple PCs 34 and or storage gateways 38, all connected by the same LAN 70. It is anticipated that users will own and operate multiple PCs 34 in a single home for example, with different content 10 cached on each PC 34. In one embodiment, the focus will be on a singular GUI module located and executed on a PC.

Three Functional Modes of the System

In one embodiment, there are three functional modes: (1) setup, (2) real-time user controlled content/data delivery, and (3) automatic content/data delivery.

The setup functions provide the user with the ability to organize and manage digital still image and video content that is to be sent to a digital picture frame 160. Content 10 may be stored or generated on Internet 8, or may exist on a local storage device, such on the PC's 34 hard disk drive 30, or on storage gateway 38. In one embodiment, this content is organized and managed with the use of device content editors that are an aspect of GUI module 46 of system control application 18.

Figure 8:
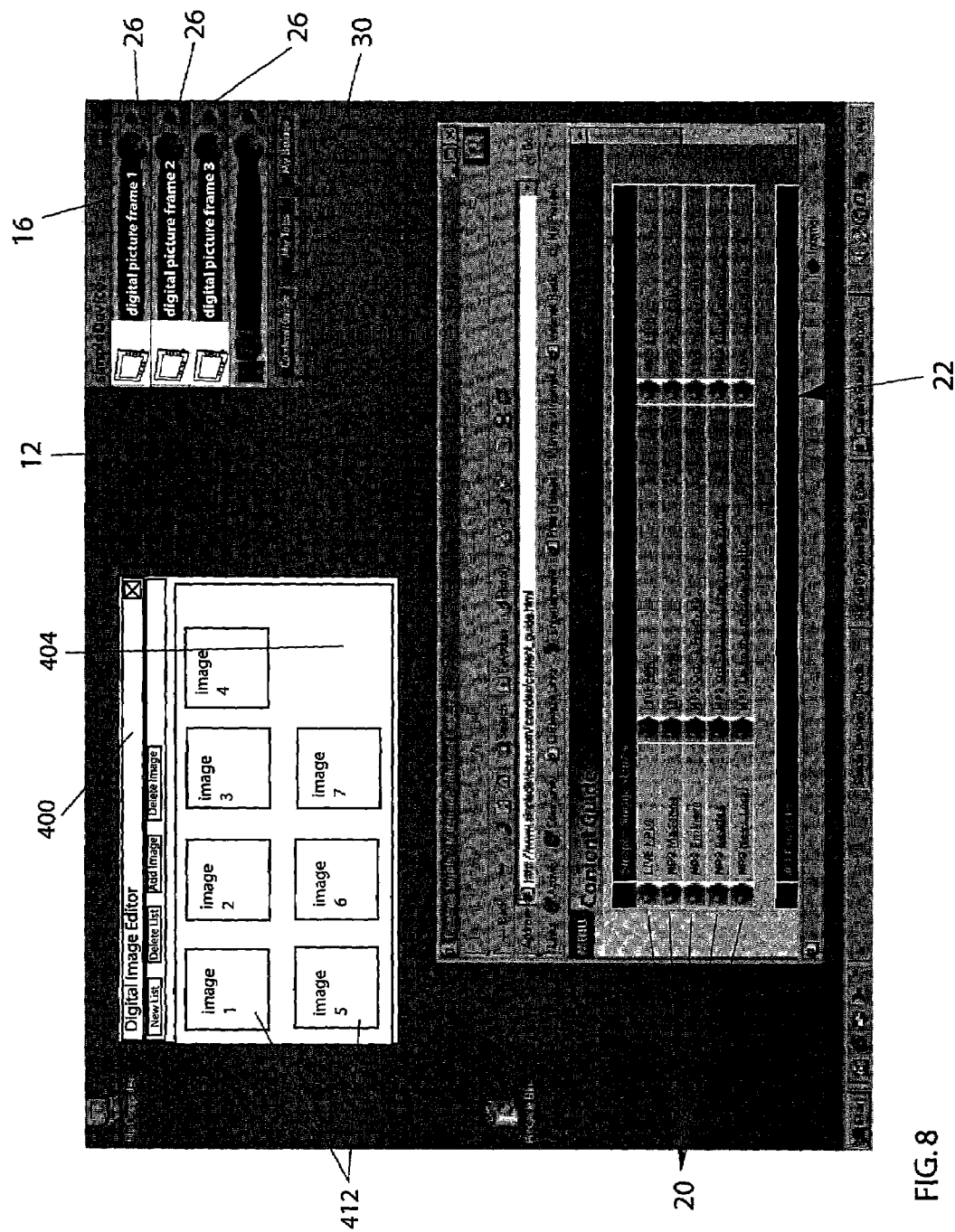
FIG. 8. illustrates one embodiment of a web-based content guide GUI window and a digital image sequence editor on a PC display desktop window.

Digital image sequence editor 400, shown in FIG. 8, is a part of GUI module 46 and may be used for managing and manipulating digital still image and video content 10 that will be sent to networked digital picture frame 160. Digital image sequence editor 400 allows the user to manage the order in which digital still image and video content 10 is presented on digital picture frame 160. In an alternative embodiment, digital image calendar editor 408 GUI, shown in FIGS. 9 through 12, is used to program and control content to be delivered to digital picture frame 160 automatically and repeatedly at a specific time and date. Content editors may be launched from console 16.

Figure 9:
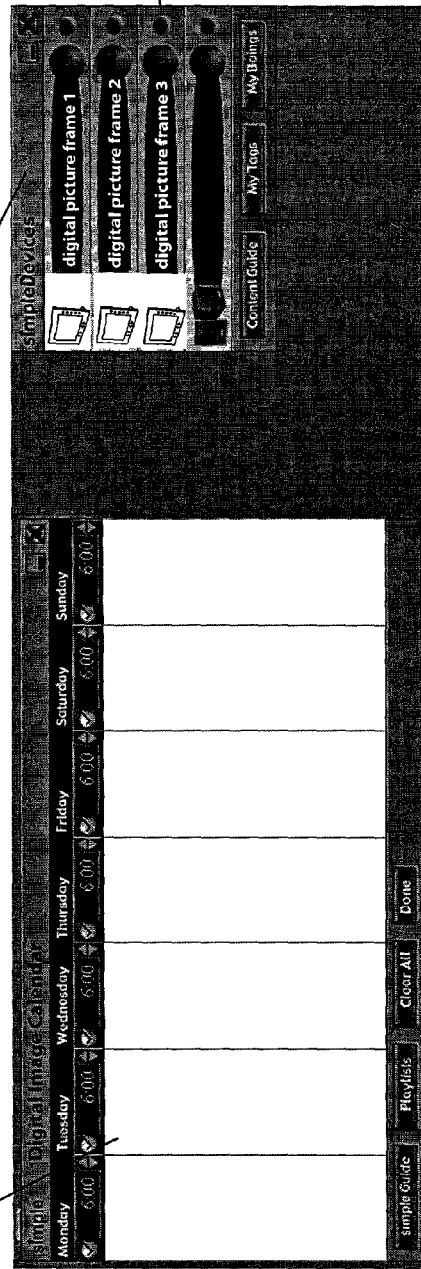
FIG. 9. illustrates one embodiment of a web-based content guide GUI window and an digital image calendar GUI.
Figure 9:
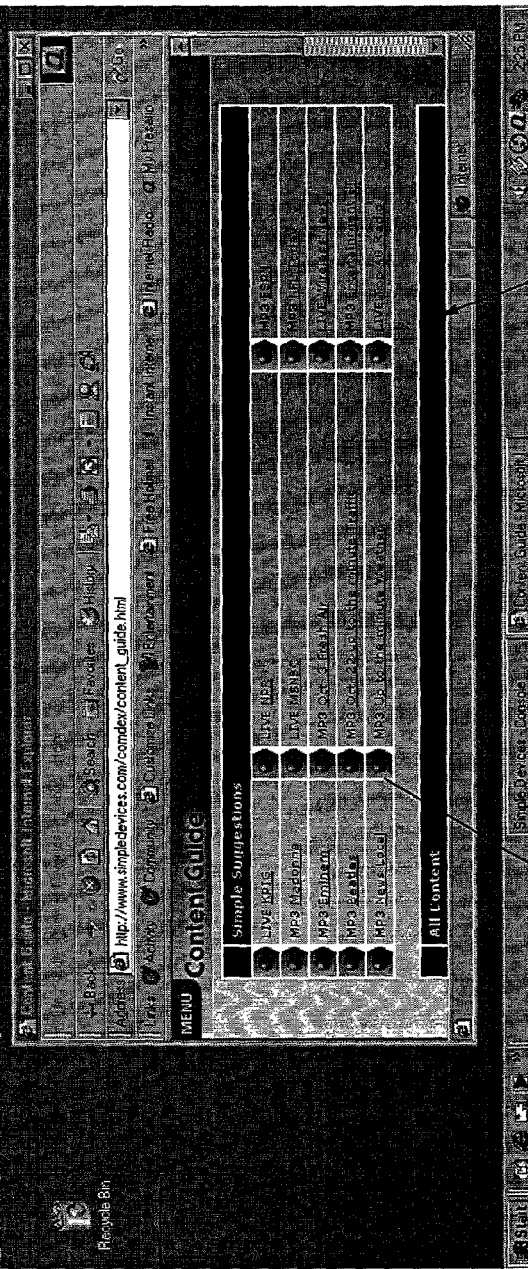
Figure 10:
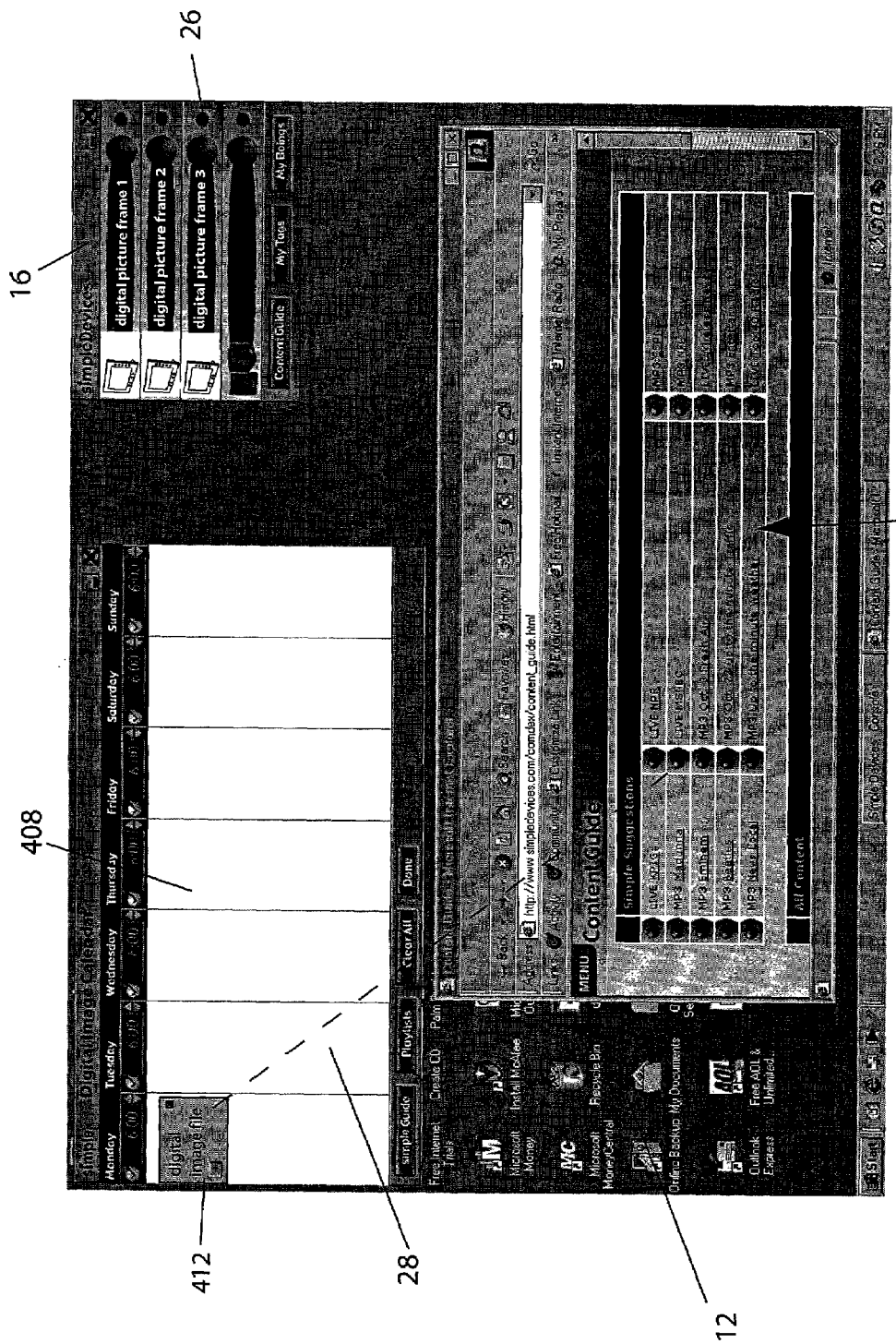
FIG. 10. illustrates one embodiment of a web-based content guide GUI window and a digital image calendar GUI after a content module has been dragged and placed.
Figure 11:
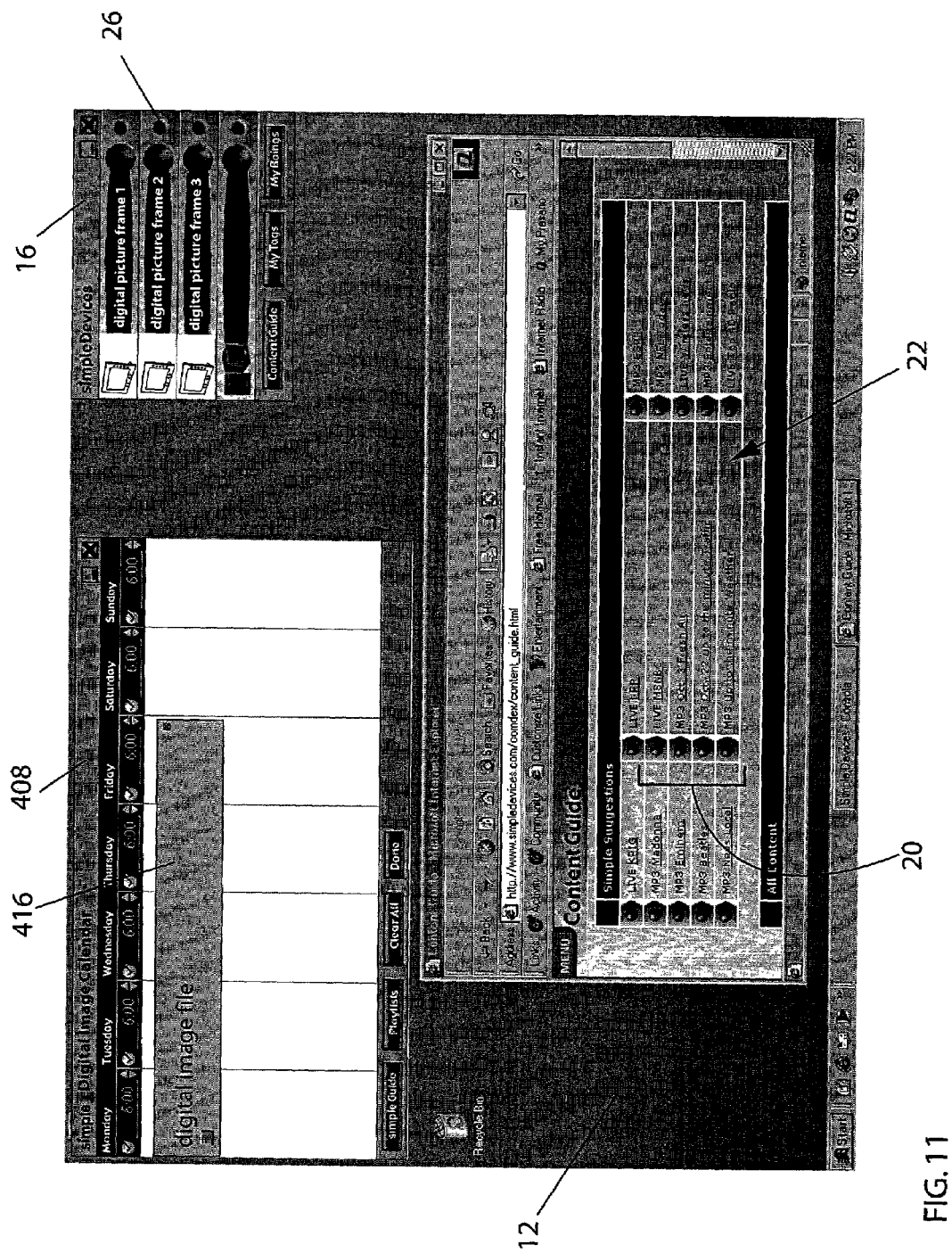
FIG. 11. illustrates one embodiment of a web-based content guide GUI window and a digital image calendar GUI after a content module has been expanded from "Monday" to "Friday"

For example, referring now to FIG. 9, the user can associate a pointer to a news stream from the Internet 8, shown as "MSNBC" in the figure, to be triggered at 8 am on Monday through Friday. This association is created by dragging and dropping 28 content object 20 from content selection web page 22, to digital image calendar editor 408. At the prescribed time, the scheduler function in core module 42 initiates the serving of content designated by content object 20, to digital picture frame 160, where it is presented to the user. The drag and drop path 28 is shown in FIG. 10.

In one embodiment, the digital image calendar editor 408 capability includes, but is not limited to the following functionality:

1. Display calendar (time, days, weeks, months, dates, and the like)
2. Select and associate content with a time and date
3. Add additional content to a pre-existing schedule
4. Delete a content object from a schedule
5. Associate a content type or content module with one of the softkey buttons 124 located on the side of digital picture frame 160. The GUI for this is shown in FIG. 12.

Figure 7:
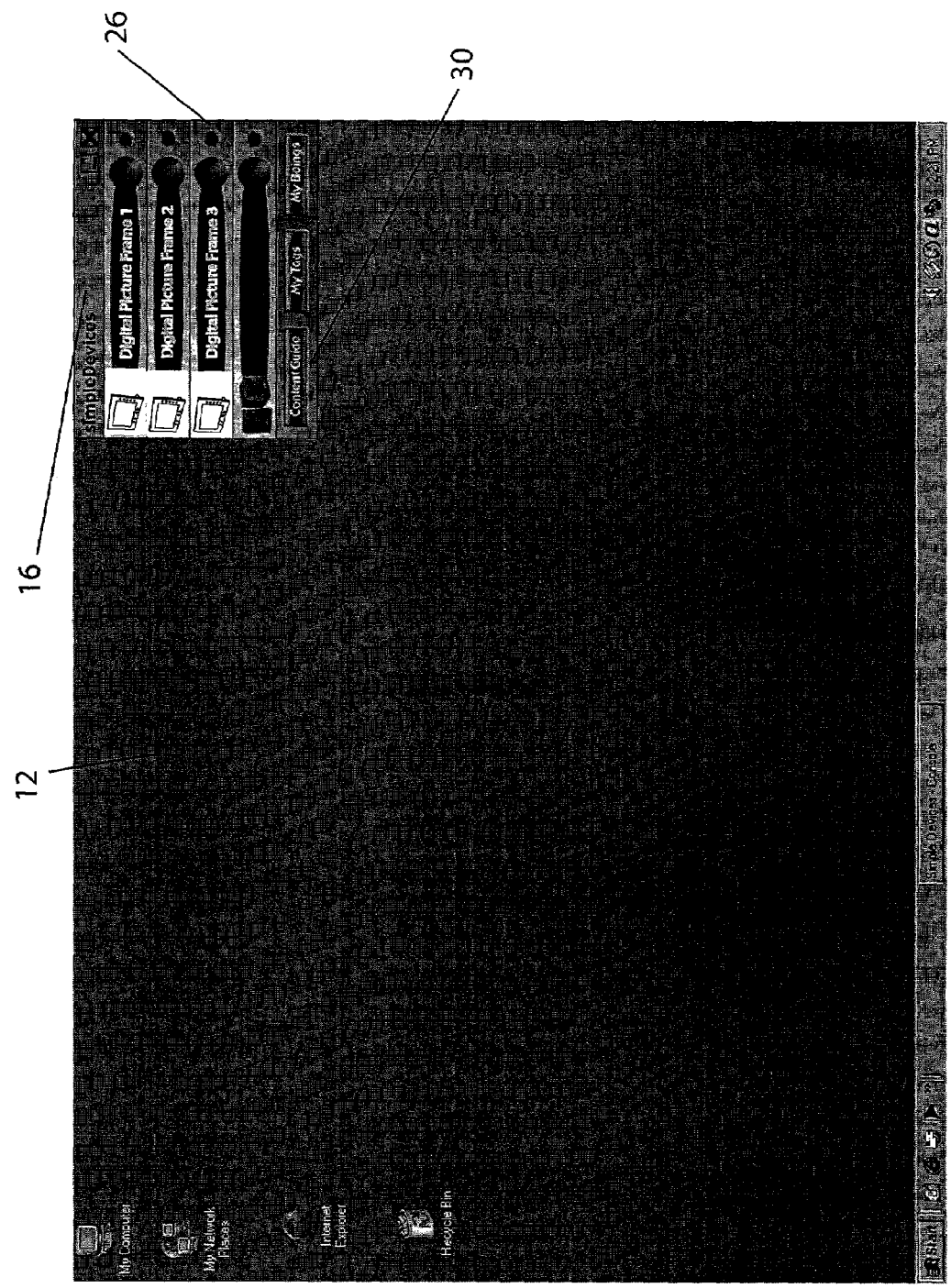
FIG. 7. illustrates and example of one embodiment of console GUI on the PC desktop.

In one embodiment, digital image sequence editor 400 is launched manually by the user by clicking on the associated digital picture frame 160 device control bar 26 on console 16. FIG. 7 shows PC desktop 12 with console 16 showing control bars for three distinct digital picture frame 160s. For example, considering FIG. 7 as the initial state of launched and running system control application 18, using the mouse the user would position the pointer on PC desktop 12 on client device control bar 26 that is associated with digital picture frame 160 and activate the left mouse button. Digital image sequence editor 400 launches and the result is shown in FIG. 8, with digital image sequence editor 400 displayed on PC desktop 12.

PC desktop 12 in FIGS. 9 through 12 also shows content selection web page 22. Content selection web page 22 can be launched in a number of ways. One method for launching content selection web page 22 is to activate the Content Guide button 30 located on the bottom of console 16 by using the mouse to place the pointer on top of Content Guide button 30, and pressing and releasing the left mouse button. Another launching method is to have content selection web page 22 "bookmarked" (Netscape Navigator) in a browser, or added to a "favorites" list in a browser (Microsoft Internet Explorer).

The spherical icons on content selection web page 22 are content objects 20 that are dragged and dropped onto the digital image sequence editor content field. Using the mouse to control the pointer on PC desktop 12, the user moves the pointer on top of content object 20, depresses the left mouse button, and moves the pointer-content object 20 bundle to content field 404 window 34 of digital image sequence editor 400 (while continuing to depress the left mouse button). When the user releases the left mouse button, a smaller preview image 412 of content object 20 appears in digital image sequence editor 400 content field 404, as shown in FIG. 8.

The user can also add digital still image or video files to content field 404 using a conventional Windows dialog box that allows the user to navigate to a specific sub-directory on PC 34. This type of PC 34 file access is a well-known function of PCs 34.

On the software action level, when a user creates or modifies content field by adding files such as described above using digital image sequence editor, GUI module 46 modifies system control application database 96, a file that contains the text names of digital still image or video files, the paths of local digital image or video content files, and URLs of digital still image files, or video files, or video streams, that the user has selected. A copy of system control application database 96 is stored on both the PC's hard disk drive and on the storage gateway's hard disk drive.

In one embodiment, a portion of, or all of the files that are set up by the user in content field 404 that are accessed at digital picture frame 160 are stored on storage gateway 38. In this scenario, digital still image and video content 10 is still transmitted to digital picture frame 160 if PC 34 has been shutdown. The system may also function with the some or all of the files that constitute the tracks listed in audio device content editor 24 stored on the PC 34. The PC 34 must be booted and functioning for the user to access any files stored on PC 34.

FIG. 9 shows an initial state for using digital image calendar editor 408. Digital image calendar editor 408 is formatted as a calendar (with a time domain format), allowing digital picture frame 160 to have varying content depending on the time of day and day. In one embodiment, digital image calendar editor 408 is also launched from console 16. FIG. 9 shows digital image calendar editor 408 after content object 20 has been dragged onto the editor window in the "Monday" slot. FIG. 10 shows that the user has dragged content object 20, expanding it across the weekly calendar slots, stopping on the "Friday" slot. Once content object 20 is dragged and placed onto digital image calendar editor 408, content object 20 is referred to as an expandable content bar 416. Expandable content bars 416 are dragged across the day sections of digital image calendar editor 408 by using the mouse to position the pointer on the right side of expandable content bars 416, depressing the left mouse button, dragging across digital image calendar editor 408 (expandable content bar 416 will graphically elongate) while keeping the mouse button depressed. The mouse button can be released when expandable content bar 416 is dragged to the last day on which content 10 referred to by expandable content bar 416 is to be played. Again referring to FIG. 10, the result of this programming activity is that every day of the week between Monday and Friday, core module 42 will automatically send prescribed content 10 to digital picture frame 160 at the time indicated on left hand side of digital image calendar editor 408.

In setup mode, GUI module 46 receives commands from the user via the GUI that is drawn on PC desktop 12. The user's actions and decisions are recorded by device content editors such as digital image calendar editor 408 and digital image sequence editor 400 which included in GUI module 46, are encoded as digitally described messages, and are then communicated to and stored in system control application database 96 by core module 42.

Real-Time Mode

In real-time mode, the user can activate and control the delivery of digital still image or video content 10 that has been set-up in digital image sequence editor 400 or digital image calendar editor 408, at digital picture frame 160. In one embodiment, the user can access content field 404 information on an interface at digital picture frame 160. For example the user can use the control buttons 168 to look at content field 404 on the digital picture frame 160. The control buttons 168 can then be used to highlight the digital image that the user wants to show and then that digital image can be selected to be viewed at full size on digital picture frame 160. The user can also use the control buttons 168 to hold on a single digital image.

When the user activates control buttons 168 on digital picture frame 160, messages corresponding to each button activation are decoded by microprocessor 192 in digital picture frame 160 and an XML message 74 is sent from digital picture frame 160 to core module 42 requesting that the corresponding digital images be sent via high-speed LAN 70 to digital picture frame 160. Core module 42 receives XML message 74 and sends the required digital image or video files to digital picture frame 160, via high-speed LAN 70. Microprocessor 192 processes and displays digital image or video content files.

In the case when the user activates a button to play a particular streaming video file shown on content field 404, an XML formatted message 74 is sent to core module 42 stating that a play command was activated. Core module 42 initiates a stream of that file or Internet 8 stream to digital picture frame 160. The following are a list of functions provided by control buttons 168:

1) Show content field corresponding to current digital still image or video sequence. Content field is a number of small images.
2) Move a visual selection highlight to successive through the digital images in content field.
3) Make a selected digital image full size
4) Hold on currently presented digital still image or video Automatic Mode, Playback In one embodiment, in automatic mode, digital still image or video content 10 that the user has selected for presentation in the content editor is sent automatically to the digital picture frame 160, based on some prescribed time setting that was pre-set by the user. A scheduling function in core module 42 compares time inputs listed in system control application database 96 with the current state of PC 34 system timer. When a match occurs between a time input in system control application database 96 and the current state of PC 34 system timer, core module 42 initiates the delivery of digital still image or video content 10 to digital picture frame 160. In the case where content 10 is a file or a stream from a URL on Internet 8, a connection is created by core module 42 between the streaming URL via broadband communication link 14, through storage gateway 38, and via LAN 70 to digital picture frame 160.

Automatic Modes Caching

In one embodiment, certain content objects 20 designate a location for file-based content 10 that changes on a regular basis. In this case, a specific file is a content object 20 instance that is cached on local PC 34 or storage gateway 38 and transmitted to digital picture frame 160. For example, a digital still image file may be associated with news located on a server on Internet 8 that may be updated every four hours. If content object 20 instance is a file designation that is not local, the scheduling function in core module 42 will periodically check the file at its location on Internet 8 to see if the file has changed. It will do this by comparing the locally cached file's creation date and title, and other file information, with the file located on Internet 8. If the file's creation date and/or title has changed, the new file will be downloaded and stored on PC 34 or storage gateway 38, so that the latest file can be sent to digital picture frame 160 at the prescribed time. This is part of the scheduling function listed in core module 42 functions in FIG. 2.

Storage gateway 38 is an "always-on" device. Therefore, in one embodiment, the scheduling function running on core module 42 on storage gateway 38 may be set to automatically access and acquire content 10 on Internet 8 at times when wide area network bandwidth is less expensive, such as overnight or during midday. Core module 42 on storage gateway 38 may also limit data-rates at certain times to further optimize wide area network bandwidth usage. For example, core module 42 can be limited to download data-rate speeds of 200 Kbps during the hours of 4 pm to 10 pm, and allowed to download at the maximum broadband rate any other time. In one embodiment, this download optimization setting can be set by users, who may want access to bandwidth while they are home in the evening. In an alternative embodiment, it may be set by network operators. These data-rate control settings and times may be set using a network bandwidth optimization control GUI, accessible by user at PC 34 or by network operators remotely. The data-rate control settings and times are stored in system control application database 96.

System-Wide Functions—Tag Interactivity

Because LAN 70 technology is a two-way interconnection technology, responses from digital picture frame 160, in one embodiment, may be sent back through the system and processed and presented to the user and other interested entities at both PC 34 and on the web. FIG. 3 shows tag button 170 on digital picture frame 160. During the playing of content 10, activation of tag button 170 by the user results in a transmission of XML message 74 back through LAN 70 informing core module 42 that the tag button 128 was activated. Core module 42 then compiles and transmits tag XML message 74 to tag storage and processing server. The information in core module 42 tag XML message 74 may include but is not limited to: metadata or meta-tags included in the file or stream (characters or images); the file name if content 10 is a file; the URL or IP address of the stream if content 10 is a stream; time; date; and user identifier.

The transmission of tag XML message 74 can have different results. The information in the message may be formatted as a readable text message and presented to a user on a personal tag aggregation web page 56. In this scenario, the user has signed up with an account and receives a password for entry into protected tag aggregation web page.

For the tagging function, the core module 42 should have access to accurate time and date information. FIG. 2 shows that core module 42 has a function that accesses a server on Internet 8 where accurate time and date data is available, and these quantities are stored locally by core module 42 in system control application database 96 and is updated relative to the internal time and date timer located internal to PC 34 or storage gateway 38 that stores and runs core module 42 aspect of system control application 18.

Television as GUI Output Device

An alternative embodiment of this system includes the TV as an output device for using GUI module 46 aspect of system control application 18. In this embodiment, as shown in FIG. 14, system control application 18 resides on a set-top box that includes the components and functionality of storage gateway 38. Set-top boxes are available that include a DOCSIS cable modem 94 as well as a CATV tuner, hard disk drive 30, and microprocessor.

In this system, the TV can be used as the output device on which the device control GUIs are visually presented, and a set top box remote control with a cursor pointing function is the input device. The GUI images look and function similarly to those shown in FIG. 7 through FIG. 12. Most set-top boxes already contain the circuitry and firmware to draw images on a TV screen (NTSC format), so GUI module 46 would be minimally modified to support the number of pixels on conventional TV screens.

In alternative embodiments, the system can also be operated whereby system control application 18 resides on the set-top box and GUI module 46 runs on PC 34. The set-top box and PC 34 are connected via a LAN 70 and system control application 18 and GUI module 46 are functionally connected using the LAN 70. The database and content files reside on the hard disk drive on the set-top box.

Storage Gateway Peripheral

A storage gateway peripheral 134 is defined as a computer with a integral hard disk drive 30 and processing capability, and an integral wireless LAN transceiver 58 to provide LAN 70 connectivity, that is added to an existing gateway device for the purpose of adding content 10 mass storage and serving capability. Storage gateway peripheral 134 is connected to gateway via a wired LAN connection, in this case Ethernet that is included in all gateways. Storage gateway peripheral is always on, and includes power management features such as the ability to power down hard disk drive 30. Core module 42 is stored and runs on storage gateway peripheral, thus all of the services and functions provided by a system using a storage gateway 38 are provided with the use of a storage gateway peripheral.

GUI Content Editors on Storage Gateway or Gateway Storage Peripheral

In one embodiment, the content editors can be programmed and executed across the network as Java applications stored on storage gateways 38 or on a storage gateway peripheral device. The advantage of this is that any computer with a display and input peripherals such as a keyboard and a mouse, and that has a Java Virtual Machine (JVM), would be a viable client device content programming, set-up, and control workstation. This embodiment could also be implemented so that it was entirely browser-based. A user could access the device content editors within a browser window, with the application running as a Java applet.

Alternative Embodiments

The system for providing content distribution, management, and interactivity for digital picture frame 160 has several permutations that have not yet been explicitly mentioned. For example, some, but not including all, permutations that are implied are the following: the system can be wholly controlled through the PC 34; the system can include numerous player digital picture frame 160s on the LAN 70.

FIG. 14 shows a system for providing content distribution, management, and interactivity for digital picture frame 160 where the storage gateway system is a digital cable set-top box 154 with a hard disk drive 30. In this embodiment, one TV 162 is connected directly to the set-top box 154 via the conventional NTSC output. Subsequent TVs 162 as well as webpads and other devices may be connected via wireless or wired LAN communications links 70. The system control application 18 runs on the set-top box and operates with the TV 162 that is directly connected as a digital picture frame 160 so that user interactions on any of the user interaction devices mentioned above are processed accordingly.

Web-Based System Control Application

In an alternative embodiment there is a website that is accessed for the purpose of downloading and setting up the system control application 18 on PC 34, and for controlling the content that is sent to digital picture frame 160, and for controlling the features of digital picture frame 160. This website is accessible from any computer that is connected to the Internet 8 and includes a browser. The website also contains a database for storing the content preferences of the user or owner of digital picture frame 160. These content preferences include pointers to the locations of the digital still image and video files on Internet 8 that the user had specified to be presented on digital picture frame 160. The website could also include a server-based version of system control application 18 that would retrieve and store content and data according to user preferences on the web.

A web-page is used to choose a particular device that is to be controlled or set-up. The web-page may be similar in function to console 16.

Webpad Client Device

In one embodiment, digital picture frame 160 is a portable computing device referred to as a webpad that is able to be carried around the house or within range of LAN 70. Webpad includes a set of rechargeable batteries and a battery recharging system. There is also a dock into which the webpad is placed during times when it is not used. When it is docked, there are electrical contacts in the dock that make contact with the electrical contacts on webpad and the batteries are recharged. Webpad also has stored in its non-volatile memory an identifying serial number, which is used to identify webpad on the wireless network, and is also used to coordinate the content that is specified by the user to be sent to and cached at the local PC 34, and ultimately sent wirelessly to webpad.

Additionally, webpad can access the Internet 8 via PC 34 or storage gateway 38, utilizing PC 34 or storage gateway 38 as a router. When webpad is placed in the charging cradle, digital still images or video can be sent to webpad so that it functions as a fixed digital picture frame 160. The content editors and system described above are used to program and automate the serving of digital still images and video to webpad.

Furthermore, webpad can be used to control other digital picture frames 160. For example, a webpad version of digital image sequence editor 400 GUI and digital image calendar editor 408 GUI allow the user to program the content for digital picture frame 160 in real time while away from PC 34. XML messages 74 are sent from webpad to PC 34 or storage gateway 38, processed by core module 42, and appropriate XML messages are sent to digital picture frame 160. An embodiment of the digital image sequence editor 400 that is implemented as a web-page and runs in a browser, using HTTP and HTML, can be used to provide the digital image sequence editor function on the PDA. LAN 70 could be implemented with a number of different of wireless systems such as 802.11b, 802.11a, or Bluetooth™. The wireless communication system could be a digital 900 Mhz system used on many cordless phones. The system could be implemented with a phone line network system where the house wiring is used as the network physical layer for communication between PC 34 and digital picture frame 160. The system can also be implemented using wired Ethernet as the LAN physical layer. The system could be implemented using an AC power line networking technology that uses the AC wiring in the home as the network physical layer. It should be noted also, that the system will work with any type of connection to the internet, including other broadband technologies such as DSL or fixed wireless, or a dialup modem connection.

In an alternate embodiment, the digital picture frame 160 includes a power jack located at the back of the frame that can be used to periodically recharge the batteries in the device, and/or to power the device when it is required to display pictures for an extended length of time.

In a further embodiment of the invention, the user can set (through software on PC 34) predetermined times for digital picture frame 160 to display its images that overrides the motion detection and sleep mode functions of the device so that the device displays images at certain periods of the day, regardless of whether or not it detects motion.

Digital picture frame 160 system has several permutations that have not yet been explicitly mentioned, but are implied: the buttons on the digital picture frame 160 and their associated functions can be regarded as optional; the motion detector and its related functions on the digital picture frame 160 can be regarded as optional; the precise shape of the digital picture frame 160 may differ from the shape depicted in the drawings.

A digital image frame and method for using the same have been described. Although the present invention is described herein with reference to specific embodiments, many modifications and variations therein will readily occur to those with ordinary skill in the art. Accordingly, all such variations and modifications are included within the intended scope of the present invention as defined by the following claims.

What is claimed is:

1. An apparatus comprising:
a digital image frame coupled with a computer system via a local area network (LAN) comprising a display device surrounded by an enclosure modeled to resemble a picture frame, a buffer memory, a wireless LAN transceiver for use in exchanging data between the digital image frame and the computer system via the LAN, and a control system in communication with the display device, the buffer memory, and the wireless LAN transceiver, where the wireless LAN transceiver receives digital image data streamed from the computer system, the control system decodes the streamed digital image data received by the wireless LAN transceiver and stores the decoded digital image data in a portion of the buffer memory, the control system reads the decoded digital image data from the portion of the buffer memory to thereby display a representation of the decoded digital image data in the display, and the control system frees the portion of the buffer memory after a predetermined time period to thereby make the portion of the buffer memory available to store further decoded digital image data resulting from further digital image data streamed from the computer system and received by the wireless LAN transceiver.

2. The apparatus as recited in claim 1, comprising a programmable key actuatable for causing the control system to transmit to the computer system via the wireless LAN transceiver a request for the computer system to stream specific digital image data.

3. The apparatus as recited in claim 1, wherein the display comprises a LCD.

4. The apparatus as recited in claim 1, comprising a motion sensing subsystem in communication with the control system for inhibiting display of the representation of the received, streamed digital image data in the display.

5. The apparatus as recited in claim 4, wherein the motion sensing subsystem and the control system further cooperate to manage power drawn by the display.

6. The apparatus as recited in claim 5, wherein the motion sensing subsystem and the control system further cooperate to control backlighting associated with the display.

7. The apparatus as recited in claim 1, comprising a heat sensing subsystem in communication with the control system for inhibiting display of the representation of the received, streamed digital image data in the display.

8. The apparatus as recited in claim 1, comprising a stand rotatably attached to a back of the enclosure opposite the display where the stand is moveable relative to the back of the enclosure to allow the enclosure to be set upon a horizontal surface.

* * * * *